United States Patent Office 3,309,212
Patented Mar. 14, 1967

3,309,212
MANUFACTURE OF CERAMIC SHAPES OR BODIES
Irwin J. Lubalin, Rockville Centre, N.Y., assignor to Avnet-Shaw Corporation, Plainview, N.Y., a corporation of New York
No Drawing. Filed Apr. 18, 1962, Ser. No. 188,539
13 Claims. (Cl. 106—84)

This invention relates to ceramic shapes or bodies. In particular, it is directed to improvements in the manufacture of ceramic shapes or bodies which are formed from slurries comprising ceramic particles distributed in a suitable liquid designated as a "binder," said binder under-going gelation in consequence of the action thereon of a suitable "gelling" agent. The binder may be either organic, as for example esters of silicic acid, titanic acid and zirconic acid or inorganic acid, as for example aqueous solutions of alkali metal silicates, such as sodium or potassium silicates.

In the methods currently employed for the manufacture of such refractory objects, suitably graded refractory particles are weighed out, and a requisite amount of the binder, to which has been added a predetermined amount of the gelling agent, are combined and formed into a slurry. The gelation time is controlled by regulating the amount of the gelling agent present in the slurry. In order to provide for uniformity of distribution of the gelling agent so as to obtain a refractory object of uniform characteristics, i.e., devoid of ungelled or incompletely gelled areas (sometimes called hard and soft spots), one must allow requisite time to effectuate the uniform and thorough distribution of the gelling agent throughout the slurry; as well as to effectuate the complete wetting of all the refractory particles by the binder. If insufficient time is allowed for the formation of a truly uniform slurry, premature gelation may occur, and often does occur, resulting in the formation of imperfect objects.

The technique just described is used in the manufacture of refractory shapes such as electrical insulators, furnace furniture, furnace linings, crucibles, heat exchange tubes, glass forming equipment, molds and cores for metal casting, etc. The techniques are employed, for example, in the modern version of the lost wax art (sometimes referred to as fugitive bath art) and improvements therein. Examples of such techniques are described in Shaw et al., Patent No. 2,593,352 and Shaw Patent No. 2,795,022 (organic binders) and Shaw Patent No. 2,811,760 (inorganic binders) and other patents in the wake thereof.

For the reasons set forth above, it has been the practice to produce refractory shapes and bodies aforesaid by batch methods in accordance with the techniques described.

It will be obvious that the batch techniques described which require the allowance of requisite time to effectuate the uniform commingling of refractory particles, binder and gelling agent, has deterred the development of suitable techniques for the rapid preparation of the gelable slurry and, particularly, the mechanization of refractory body formation so as to provide for a high production rate thereof.

It has now been found that it is possible to provide the art with a mechanization technique which allows for a high production rate.

In its principal aspects, the instant advance in this art consists in creating stocks of two mobile slurries containing refractory particles and an appropriate gelling agent (suitably present for subsequent action), each possessed of great stability. In consequence of the fluidity of these slurries, they may be combined by suitable manipulative techniques to create a final gelable slurry of marked uniformity, which final gelable slurry can be formulated so as to set rapidly and create a shape of desired perfection.

The utilization of the two mobile slurries makes it possible, moreover, to distribute the same from suitable storage containers through suitable conduits or piping to the site where they are to be combined. Indeed, the utilization of two such slurries makes it possible to charge them to a suitable apparatus where they are combined and the combination then dispensed automatically into suitable molds.

Accordingly, it is among the principal objects of this invention to provide: a marked increase in the production rates of refractory shapes or bodies; means for mechanizing the production of such refractory bodies; enhanced uniformity in structure and composition of such refractory bodies, e.g., elimination of the weak spots where the binder has failed thoroughly to wet the refractory particles; marked diminution in the time required to effect gelation without loss of perfection in the formed objects, and hand strength, etc., of the formed object, all without development of soft and hard spots; closer control, not only of the gel time, but substantial diminution of such time; improved strength by virtue of the premixing of the refractory particles with the liquid binder thereby permitting thorough wetting of the particles with the binder.

Where the gelling agent is employed in a form which requires triggering by another substance to produce gelling, the gelling agent can be present as a component of the slurry containing the binder. Where the gelling agent employed causes gelation upon coming into contract with the binder, the binder constitutes a component of one slurry, and the gelling agent is made a component of the second slurry.

For example, where the gelling agent is, for instance, an amine which, under anhydrous conditions, does not cause gelation of the binder until water is introduced into the system, the binder and the amine can both constitute components of one slurry; while the water is made a component of the second slurry. In such a system, the water is in effect, the gelling accelerator, since the amine remains inert until it is activated by the water.

*Example 1*

A slurry (A) is prepared from 55 milliliters of ethyl silicate binder (a binder in accordance with U.S. Patent No. 2,911,310) and ¾ lb. of suitably graded zircon refractory.

A second slurry (B) is prepared from 62 milliliters of isopropanol, 10.5 milliliters of 20% aqueous ammonium carbonate solution and ¾ lb. of suitably graded zircon refractory.

Equal portions of slurries (A) and (B) are combined rapidly, stirred and poured over a pattern. The combined slurries gel in about one minute.

*Example 2*

A slurry (A) is prepared from 100 milliliters of an aqueous solution of sodium silicate (18% $SiO_2$ content) and 1½ lbs. of suitably graded zircon.

A slurry (B) is prepared from 100 milliliters of water,

1½ lbs. of suitably graded zircon and 5 grams of potassium silicofluoride.

When equal proportions of (A) and (B) are rapidly combined, stirred and poured, the combination provides for the manufacture of a shell mold or a core. At room temperature, the mixture of slurries (A) and (B) gels in about 1½ minutes.

*Example 3*

A slurry (A) is prepared from 1.2 lbs. of suitably graded zircon, 0.15 lb. of suitably graded silica and 100 milliliters of an aqueous solution of potassium silicate ($SiO_2$ content 18%).

A slurry (B) is prepared from 100 milliliters of a solution of 10% by weight of ethylene carbonate, the solvent consisting of 85% by volume of water and 15% by volume of ethanol, 1.2 lbs. of suitably graded zircon and 0.15 lb. of suitably graded silica. Slurries (A) and (B) are combined and a core made therefrom. At room temperature, the mixed slurries gel in about forty seconds. The formed (green) core is cured by heating, and firing in a muffle at 800° C. This core can be used for making an intricate shape, metal being cast around it in a mold.

This core can thereafter be leached out by placing the casting in a caustic soda bath.

*Example 4*

A slurry (A) is prepared from 55 milliliters of the ethyl silicate binder (as used in Example 1) and ¾ lb. of suitably graded zircon.

A slurry (B) is prepared from 62 milliliters of isopropanol, ¾ lb. of suitably graded zircon and 25 milliliters of 20% ammonium carbonate solution.

Equal proportions of slurries (A) and (B) are combined rapidly to provide a gelable slurry which, at 35° C. gels within about fifteen seconds.

The mixed slurry can be used for making a gel mold, a core, a facing for a composite mold, or if suitably fired to high temperature, circa 1500° C., a refractory shape.

*Example 5*

A slurry (A) is prepared from 16½ lbs. of silicon carbide and one liter of a methanol-ethanol mixture (5% methanol, 95% ethanol) containing 15% of water.

A slurry (B) is prepared from 82½ lbs. of silicon carbide, 5 liters of ethyl silicate binder, as above, containing 1% by volume of piperidine and 1% by volume of dicyclohexylamine.

When equal proportions of (A) and (B) are rapidly combined, stirred and poured, the combination provides for the manufacture of sagger or crucible or other refractory shape.

In the place of silicon carbide employed in the preparation of slurry (A), there can be used sillimanite or alumina.

The separate slurries which are combined to form the final slurry are preferably of easily pourable creamy consistency. If these slurries are too thick, they do not lend themselves to easy manipulation. If they be too thin, the refractory particles tend to settle out.

Suitable consistencies are achieved, for instance, by reference to Example 1, when the ethyl silicate binder of slurries (A) ranges from 40 ml. to 75 ml. The isopropanol content of slurry (B) can range from 45 to 75 ml.

The components of the slurries can be proportioned, as is well known in this art, in accordance with the particular type of refractory object being made; and the setting time desired by varying the amount of the gelling agent or accelerator.

I claim:

1. In the manufacture of ceramic objects formed from slurries comprising ceramic particles distributed in a gelable binder and a gelling accelerator, the improvement which comprises combining: (1) a first slurry comprising a portion of the ceramic particles and the binder with (2) a second slurry comprising the balance of the ceramic particles and the gelling accelerator, and allowing the combined slurries to gel.

2. In the manufacture of ceramic objects formed from slurries comprising ceramic particles distributed in a gelable binder and a gelling accelerator, the improvement which comprises combining: (1) a first slurry comprising a portion of the ceramic particles and an organic binder with (2) a second slurry comprising the balance of the ceramic particles and the gelling accelerator, and allowing the combined slurries to gel.

3. In the manufacture of ceramic objects formed from slurries comprising ceramic particles distributed in a gelable binder and a gelling accelerator, the improvement which comprises combining: (1) a first slurry comprising a portion of the ceramic particles and an inorganic binder with (2) a second slurry comprising the balance of the ceramic particles and the gelling accelerator, and allowing the combined slurries to gel.

4. In the manufacture of ceramic objects formed from slurries comprising ceramic particles distributed in a gelable binder and a gelling accelerator, the improvement which comprises combining: (1) a first slurry comprising a portion of the ceramic particles and an alkyl silicate with (2) a second slurry comprising the balance of the ceramic particles and the gelling accelerator, and allowing the combined slurries to gel.

5. In the manufacture of ceramic objects formed from slurries comprising ceramic particles distributed in a gelable binder and a gelling accelerator, the improvement which comprises combining: (1) a first slurry comprising a portion of the ceramic particles and ethyl silicate with (2) a second slurry comprising the balance of the ceramic particles and the gelling accelerator, and allowing the combined slurries to gel.

6. In the manufacture of ceramic objects formed from slurries comprising ceramic particles distributed in a gelable binder and a gelling accelerator, the improvement which comprises combining: (1) a first slurry comprising a portion of the ceramic particles and an alkali metal silicate with (2) a second slurry comprising the balance of the ceramic particles and the gelling accelerator, and allowing the combined slurries to gel.

7. In the manufacture of ceramic objects formed from slurries comprising ceramic particles distributed in a gelable binder and a gelling accelerator, the improvement which comprises combining: (1) a first slurry comprising a portion of the ceramic particles and a sodium silicate with (2) a second slurry comprising the balance of the ceramic particles and the gelling accelerator, and allowing the combined slurries to gel.

8. In the manufacture of ceramic objects formed from slurries comprising ceramic particles distributed in a gelable binder and a gelling accelerator, the improvement which comprises combining: (1) a first slurry comprising a portion of the ceramic particles and potassium silicate with (2) a second slurry comprising the balance of the ceramic particles and the gelling accelerator, and allowing the combined slurries to gel.

9. In the manufacture of ceramic objects formed from slurries comprising ceramic particles distributed in a gelable binder and a gelling accelerator, the improvement which comprises combining: (1) a first slurry comprising a portion of the ceramic particles, an alkyl silicate, and an amine gelling agent with (2) a second slurry comprising the balance of the ceramic particles, water soluble alcohol, and water, and allowing the combined slurries to gel.

10. The improvement in accordance with claim 9 wherein the alkyl silicate is ethyl silicate.

11. The improvement in accordance with claim 10 wherein the amine gelling agent is piperidine.

12. The improvement in accordance with claim 10 wherein the amine gelling agent is dicyclohexylamine.

13. The improvement in accordance with claim 10 wherein the gelling agent is a mixture of piperidine and dicyclohexylamine.

References Cited by the Examiner

UNITED STATES PATENTS

| | | | |
|---|---|---|---|
| 2,218,243 | 10/1940 | Lathe et al. | 106—84 |
| 2,550,923 | 5/1951 | Hackford et al. | 106—38.3 |
| 2,818,619 | 1/1958 | Bradley et al. | 22—193 |
| 2,880,097 | 3/1959 | Emhiser | 106—84 |
| 2,948,935 | 8/1960 | Carter | 22—193 |
| 3,024,125 | 3/1962 | Lee. | |

MORRIS LIEBMAN, *Primary Examiner.*

ALEXANDER BRODMERKEL, *Examiner.*

A. LIEBERMAN, *Assistant Examiner.*